United States Patent
Chu

(10) Patent No.: US 7,615,949 B2
(45) Date of Patent: Nov. 10, 2009

(54) MOTOR CONTROL APPARATUS

(75) Inventor: Chin-Chen Chu, Sinjhuang (TW)

(73) Assignee: Enermax Technology Corporation, Taoyuan (TW)

( * ) Notice: Subject to any disclaimer, the term of this patent is extended or adjusted under 35 U.S.C. 154(b) by 4 days.

(21) Appl. No.: 12/003,517

(22) Filed: Dec. 28, 2007

(65) Prior Publication Data

US 2009/0169189 A1 Jul. 2, 2009

(51) Int. Cl.
*H02H 7/09* (2006.01)

(52) U.S. Cl. ............... 318/400.22; 318/400.01; 318/400.37

(58) Field of Classification Search ........... 318/400.22, 318/400.01, 400.37, 432, 721, 268, 471, 318/400.07, 445, 799; 388/829, 822, 907.5
See application file for complete search history.

(56) References Cited

U.S. PATENT DOCUMENTS 6,310,453 B1 * 10/2001 Lin ..................... 318/445
2005/0047762 A1 * 3/2005 Liu et al. ............. 388/806

* cited by examiner

*Primary Examiner*—Karen Masih
(74) *Attorney, Agent, or Firm*—Rosenberg, Klein & Lee

(57) ABSTRACT

A motor control apparatus includes a fan motor, a hall IC, a first power generator, and a second power generator. The hall IC is coupled with the fan motor for detecting the status of the fan motor, such as rotating or stationary. The first power generator is connected with the hall IC for outputting a first voltage to the hall IC to supply the required power for the hall IC. The second power generator is connected with the fan motor for outputting a second voltage to the fan motor to control the rotation speed of the fan motor.

9 Claims, 2 Drawing Sheets

MOTOR CONTROL APPARATUS

BACKGROUND OF THE INVENTION

1. Field of the Invention

The present invention relates to a motor control apparatus. In particular, this invention relates to a motor control apparatus that uses two sets of power supplies.

2. Description of the Related Art

As the power of the elements in computers becomes higher, more heat is generated for example by the central processing unit (CPU). As the quantity of transistors in the CPU has increased from several hundred thousand to five ten million in the Pentium 4, the temperature at the surface of the CPU reaches 50~80° C. and the temperature of the interior of the CPU is over 80° C. Therefore, a lot of cooling apparatuses are developed for CPUs. Air-cooling is the most popular method. A cooling fan is the key component of the air-cooling apparatus.

The fans can be divided into two kinds, including a direct current (DC) fan and an alternating current (AC) fan. Most of the computers use DC fans, and the DC fans include brushless DC motors. Reference is made to FIG. 1, which shows a block diagram of the fan control apparatus of the prior art. The fan control apparatus includes a hall integrated circuit (IC) 10 and a fan motor 12. The hall IC generates a magnetic change to rotate the fan motor 12. The rotation speed of the fan motor 12 depends on the operation voltage.

In the fan control apparatus of the prior art, the fan motor 12 and the hall IC 10 use the same power supply VCC. However, because the required operation voltage of the hall IC 10 is higher than the starting voltage and the operation voltage of the fan motor 10, the starting voltage and the operation voltage of the fan motor 10 will be affected by the operation voltage of the hall IC 10. When the fan motor 12 is turned on, the rotation speed is too high due to the operation voltage of the hall IC 10 and a heavy noise is generated. Furthermore, when the user wishes to adjust the rotation speed of the fan motor 12, the rotation speed is also affected by the operation voltage of the hall IC 10.

The fan motor 12 needs to cooperate with the control of the hall IC 10 to be turned on and operated. However, due to the operation voltage of the hall IC 10, the starting voltage and the operation voltage of the fan motor 12 is limited. The starting voltage cannot be lowered and the rotation speed cannot be flexibly adjusted. Therefore, the fan control apparatus 1 of the prior art has the following drawbacks. (1) The starting voltage is too high so that a heavy noise is generated. (2) The operation voltage is limited so that the rotation speed cannot be flexibly adjusted.

SUMMARY OF THE INVENTION

One particular aspect of the present invention is to provide a motor control apparatus that uses two independent power supplies respectively supplying the required power, to the fan motor and the hall IC. Therefore, the starting voltage and the operation voltage of the fan motor are not limited by the operation voltage of the hall IC.

The motor control apparatus includes a fan motor, a circuit with hall IC, a first power generator, and a second power generator. The circuit with hall IC is coupled with the fan motor for driving the fan motor to rotate or stopping the fan motor. The first power generator is connected with the circuit with hall IC for outputting a first voltage to the circuit with hall IC to supply the required power for the hall IC. The second power generator is connected with the fan motor for outputting a second voltage to the fan motor to control the rotation speed of the fan motor.

The present invention utilizes two sets of the power supplies to respectively supply the required power for the hall IC and the fan motor to improve the drawbacks of the fan control apparatus 1 of the prior art, such as, the starting voltage is too high so that a heavy noise is generated and the operation voltage is limited so that the rotation speed cannot be flexibly adjusted.

For further understanding of the invention, reference is made to the following detailed description illustrating the embodiments and examples of the invention. The description is only for illustrating the invention and is not intended to limit of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
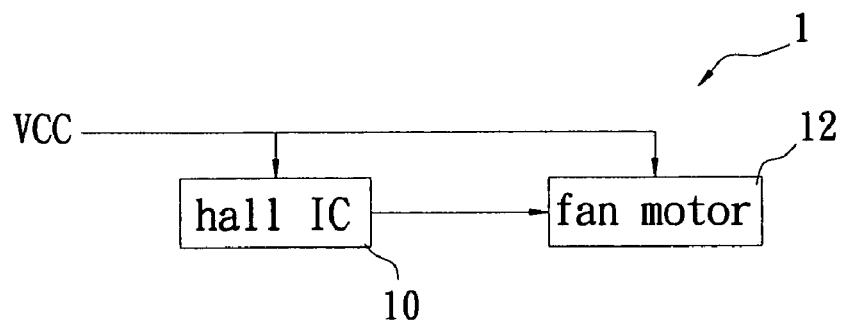
FIG. 1 is a block diagram of the fan control apparatus of the prior art.
Figure 2:
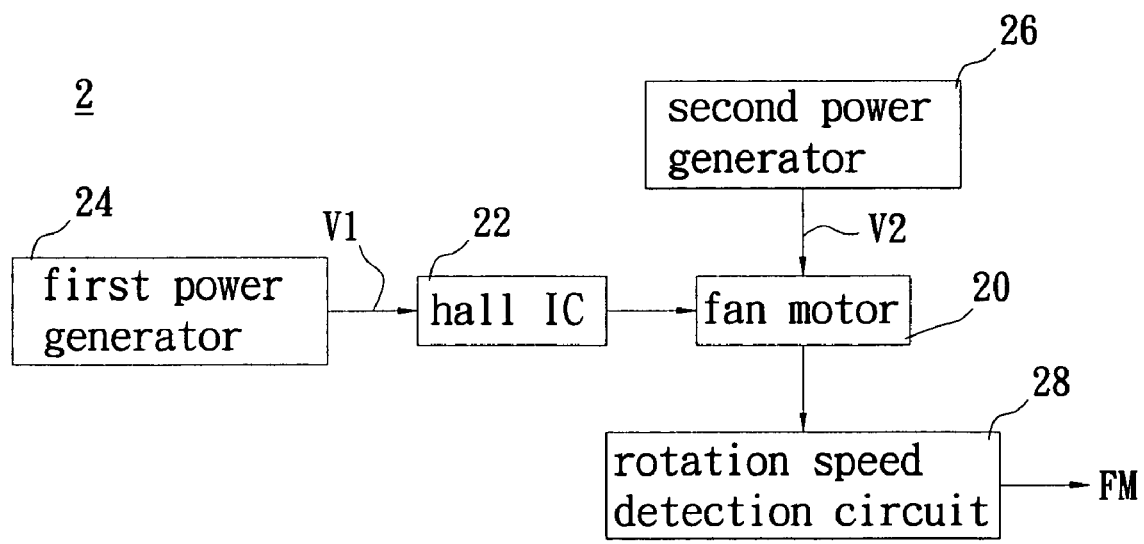
FIG. 2 is a block diagram of the fan control apparatus of the present invention.

Reference is made to FIG. 2, which shows a block diagram of the fan control apparatus of the present invention. The motor control apparatus 2 includes a fan motor 20, a circuit with hall IC 22, a first power generator 24, and a second power generator 26.

The circuit with hall IC 22 is coupled with the fan motor 20 for driving the fan motor 20 to rotate or stopping the fan motor 20. The first power generator 24 is connected with the circuit with hall IC 22 for outputting a first voltage V1 to the circuit with hall IC 22 to supply the required power for the circuit with hall IC 22. The second power generator 26 is connected with the fan motor 20 for outputting a second voltage V2 to the fan motor 20 to turn on the fan motor 20 and control the rotation speed of the fan motor 20. Furthermore, the motor control apparatus 2 further includes a rotation speed detection circuit 28. The rotation speed detection circuit 28 is connected with the fan motor 20. The rotation speed detection circuit 28 outputs a rotation speed signal FM according to the rotation speed of the fan motor 20.

Figure 3:
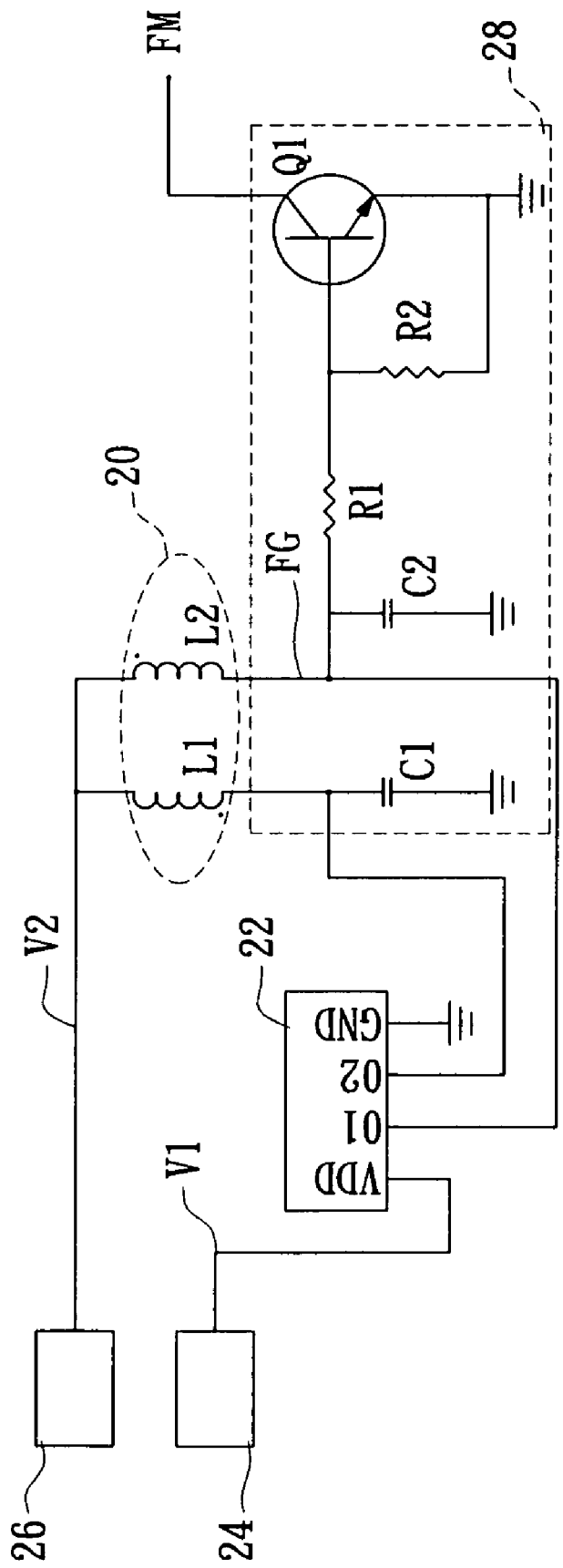
FIG. 3 is a circuit diagram of the fan control apparatus of the present invention.

Reference is made to FIGS. 2 and 3. FIG. 3 shows a circuit diagram of the fan control apparatus of the present invention. The fan motor 20 has a first induction coil L1 and a second induction coil L2. The first induction coil L1 and the second induction coil L2 receive the second voltage V2 from the second power generated 26 to generate an induction magnetic field. The circuit with hall IC 22 is coupled to the first induction coil L1 and the second induction coil L2 located in the fan motor 20. The circuit with hall IC 22 outputs a control magnetic field. The control magnetic field and the induction magnetic field react to each other to attract or repel the first induction coil L1 and the second induction coil L2 to control the rotation of the fan motor 20. When the fan motor 20 rotates, the magnetic fields on the first induction coil L1 and the second induction coil L2 are changed to generate a high-low analog signal FG. The high-low analog signal FG is the frequency generation signal.

The rotation speed detection circuit 28 includes a first capacitor C1, a second capacitor C2, a first resistor R1, a second resistor R2, and a transistor Q1. The first capacitor C1 is connected with the first induction coil L1 of the fan motor 20 in serial, and the second capacitor C2 is connected with the second induction coil L2 of the fan motor 20 in serial. The first capacitor C1 and the second capacitor C2 and the first induction coil L1 and the second induction coil L2 respectively form a serial oscillation effect to induct the magnetic field change of the first induction coil L1 and the second induction coil L2 in the fan motor 20 to obtain the high-low analog signal FG.

Reference is made to FIGS. 2 and 3. When the rotation speed detection circuit 28 obtains the high-low analog signal FG, the rotation speed detection circuit 28 turns on or turns off the transistor Q1 according to the high-low analog signal FG to process the high-low analog signal FG. After the rotation speed detection circuit 28 processes the signals, the rotation speed detection circuit 28 outputs a rotation speed signal FM. The rotation speed signal FM is provided to the rear-stage processing device (not labeled) so that the rear-stage processing device obtains the rotation speed of the fan motor 20 to monitor the fan motor 20.

Reference is made to FIGS. 2 and 3 again. The required operation voltage for the hall IC is about 3.5V. In this embodiment, the first power generator 24 outputs the first voltage V1 the hall IC 20, and the second power generator 26 outputs the second voltage V2 to the fan motor 20. In the two independent power generators 24 and 26, the first voltage V1 outputted from the first power generator 24 must be lager than the minimum operation voltage of the hall IC so that the hall IC can normally operate. The second voltage V2 outputted from the second power generator 26 is an adjustable voltage. The adjustable voltage is provided to the fan motor 20 for starting the fan motor 20 and controlling the rotation speed of the fan motor 20.

Reference is made to FIGS. 2 and 3. In this embodiment, the fan motor 20 and the hall IC operate at different power sources. Therefore, the starting voltage and the operation voltage of the fan motor 20 will not be limited by the operation voltage of the hall IC. The starting voltage and the operation voltage of the fan motor 20 can be reduced and the output of the rotation speed signal FM will not be affected. Without considering the output of the rotation speed signal FM, the starting voltage of the fan motor 20 can be reduced to reduce the noise.

The present invention utilizes two sets of the power supplies to respectively supply the required power for the hall IC and the fan motor. Thereby, the starting voltage and the operation voltage of the fan motor 20 will not be limited by the operation voltage of the hall IC. Therefore, the present invention improve the drawbacks of the fan control apparatus 1 of the prior art, such as, the starting voltage is too high so that a heavy noise is generated and the operation voltage is limited so that the rotation speed cannot be flexibly adjusted.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A motor control apparatus, comprising:
    a fan motor;
    a circuit with hall IC coupled with the fan motor for driving the fan motor;
    a first power generator connected with the circuit with hall IC, wherein the first power generator outputs a first voltage to the circuit with hall IC to supply the power required by the hall IC; and
    a second power generator connected with the fan motor for outputting a second voltage to the fan motor and controlling the rotation speed of the fan motor, wherein the second voltage is an adjustable voltage, so that a starting voltage and an operation voltage of the fan motor will not be limited by an operation voltage of the hall IC.

2. The motor control apparatus as claimed in claim 1, further comprising a rotation speed detection circuit connected with the fan motor, wherein the rotation speed detection circuit outputs a rotation speed signal according to the rotation speed of the fan motor.

3. The motor control apparatus as claimed in claim 2, wherein the rotation speed detection circuit detects a high-low analog signal of the magnetic filed change of the fan motor and the high-low analog signal is processed to output the rotation speed signal.

4. The motor control apparatus as claimed in claim 3, wherein the rotation speed signal provides the rotation speed information of the fan motor.

5. The motor control apparatus as claimed in claim 4, wherein the high-low analog signal is a frequency generation signal.

6. The motor control apparatus as claimed in claim 3, wherein the fan motor has a first induction coil and a second induction coil, and the first induction coil and the second induction coil receives the second voltage from the second power generator to generate an induction magnetic field.

7. The motor control apparatus as claimed in claim 6, wherein the circuit with hall IC is coupled with the first induction coil and the second induction coil for outputting a control magnetic field, and the control magnetic field and the induction magnetic field reacts to each other to drive the fan motor.

8. The motor control apparatus as claimed in claim 7, wherein the rotation speed detection circuit comprises:
    a first capacitor connected with the first induction coil in serial for detecting the magnetic field change on the first induction coil to obtain the high-low analog signal;
    a second capacitor connected with the second induction coil in serial for detecting the magnetic field change on the second induction coil to obtain the high-low analog signal; and
    a transistor connected with the first capacitor for generating the rotation speed signal according to the high-low analog signal.

9. The motor control apparatus as claimed in claim 7, wherein the rotation speed detection circuit comprises:
    a first capacitor connected with the first induction coil in serial for detecting the magnetic field change on the first induction coil to obtain the high-low analog signal;
    a second capacitor connected with the second induction coil in serial for detecting the magnetic field change on the second induction coil to obtain the high-low analog signal; and
    a transistor connected with the second capacitor for generating the rotation speed signal according to the high-low analog signal.

* * * * *